(12) United States Patent
Wago et al.

(10) Patent No.: US 7,401,500 B2
(45) Date of Patent: Jul. 22, 2008

(54) POSITIVE DISPLACEMENT PUMP MONITOR

(75) Inventors: Toshimichi Wago, Houston, TX (US); Jean-Louis Pessin, Houston, TX (US); Nathan St. Michel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 123 days.

(21) Appl. No.: 11/482,846

(22) Filed: Jul. 7, 2006

(65) Prior Publication Data
US 2008/0006088 A1    Jan. 10, 2008

(51) Int. Cl.
*G01M 3/24* (2006.01)
(52) U.S. Cl. ........................ 73/40.5 A; 73/168
(58) Field of Classification Search ............... 73/40.5 A, 73/168, 592
See application file for complete search history.

(56) References Cited

U.S. PATENT DOCUMENTS

| | | | |
|---|---|---|---|
| 4,571,994 A * | 2/1986 | Dickey et al. ............. 73/40.5 A |
| 4,705,459 A * | 11/1987 | Buisine et al. ................ 73/168 |
| 5,008,841 A | 4/1991 | McElroy |
| 6,338,283 B1 | 1/2002 | Blazquez |
| 6,675,665 B2 | 1/2004 | Blazquez |
| 2002/0023495 A1 | 2/2002 | Morganti |
| 2002/0124666 A1 | 9/2002 | Navarro |
| 2006/0254357 A1 * | 11/2006 | Ens et al. ...................... 73/593 |

FOREIGN PATENT DOCUMENTS

| WO | 03/091614 | 11/2003 |
|---|---|---|
| WO | 2004/102052 | 11/2004 |

* cited by examiner

*Primary Examiner*—John E Chapman
(74) *Attorney, Agent, or Firm*—Rodney Warfford; Michael Flynn; David Cate

(57) ABSTRACT

A positive displacement pump monitor. The monitor includes a sensor coupled to a housing of a pump for obtaining acoustic data therefrom. A proximity switch may be simultaneously used to keep real time timing information relative to the cycling of the pump. A data processor of the monitor may then be employed to analyze acoustic data and timing information to distinguish acceptable noise from leak information. An operator thereby may be warned of the presence of a leak in the pump.

23 Claims, 6 Drawing Sheets

POSITIVE DISPLACEMENT PUMP MONITOR

BACKGROUND

Embodiments described relate to positive displacement pumps for high pressure applications. In particular, embodiments of monitoring the condition of positive displacement pump valves during operation is described.

BACKGROUND OF THE RELATED ART

Positive displacement pumps are often employed in large high pressure applications. A positive displacement pump may include a plunger driven by a crankshaft toward and away from a chamber in order to dramatically effect a high or low pressure on the chamber. This makes it a good choice for high pressure applications. Indeed, where fluid pressure exceeding a few thousand pounds per square inch (PSI) is to be generated, a positive displacement pump is generally employed;

Positive displacement pumps may be configured of fairly large sizes and employed in a variety of large scale operations such as cementing, coil tubing, water jet cutting, or hydraulic fracturing of underground rock. Hydraulic fracturing of underground rock, for example, often takes place at pressures of 10,000 to 15,000 PSI or more to direct an abrasive containing fluid through a well to release oil and gas from rock pores for extraction. Such pressures and large scale applications are readily satisfied by positive displacement pumps.

As is often the case with large systems and industrial equipment, regular monitoring and maintenance of positive displacement pumps may be sought to help ensure uptime and increase efficiency. In the case of hydraulic fracturing applications, a pump may be employed at a well and operating for an extended period of time, say six to twelve hours per day for more than a week. Over this time, the pump may be susceptible to wearing components such as the development of internal valve leaks. Therefore, during downtime in the operation, the pump may be manually inspected externally or taken apart to examine the internal condition of the valves. However, in many cases external manual inspection fails to reveal defective internal valves. Alternatively, once the time is taken to remove valves for inspection, they are often replaced regardless of operating condition, whether out of habit or for a lack of certainty. Thus, there is the risk that the pump will either fail while in use for undiagnosed leaky valves or that effectively operable valves will be needlessly discarded.

The significance of risks such as those described above may increase depending on the circumstances. In the case of hydraulic fracturing applications, such as those also noted above, conditions may be present that can both increase the likelihood of pump failure and increase the overall negative impact of such a failure. For example, the use of an abrasive containing fluid in hydraulic fracturing not only breaks up underground rock, as described above, it also tends to degrade the physically conformable valve inserts which seal the chamber of the pump, perhaps within about one to six weeks of use depending on the particular parameters of the application. Once the chamber fails to seal during operation, the pump will generally fail in relatively short order.

Furthermore, hydraulic fracturing applications generally employ several positive displacement pumps at any given well. Malfunctioning of even a single one of these pumps places added strain on the remaining pumps, perhaps even leading to failure of additional pumps. Unfortunately, this type of cascading pump failure, from pump to pump to pump, is not an uncommon event where hydraulic fracturing applications are concerned.

Given the ramifications of positive displacement pump failure and the demand for employing techniques that avoid pump disassembly as described above, efforts have been made to evaluate the condition of a positive displacement pump during operation without taking it apart for inspection. For example, a positive displacement pump may be evaluated during operation by employing an acoustic sensor coupled to the pump. The acoustic sensor may be used to detect high-frequency vibrations that are the result of a leak or incomplete seal within the chamber of the positive displacement pump, such a leak being the precursor to pump failure as noted above.

Unfortunately, reliance on the detection of high-frequency vibration requires that the high-frequency level be established for each given application. For example, in the case of a fracturing operation an individual pump may operate under a given set of parameters including use of a particular abrasive containing fluid and operation at a given power level. Furthermore, the pump itself may be coupled to several other pumps or other equipment. These conditions under which the pump operates will result in an expected normal level of noise or vibration unrelated to any possible valve leak. Thus, for any given application of the pump, an expected or normal noise level must be accounted for in employing the acoustic sensor. That is, a baseline level of acceptable noise must be established before the technique may be effectively employed. Performing such calibrations before each new pump operation can be quite time consuming and inefficient, especially given the wide variety of operating conditions a given pump may experience from one operation to the next.

Furthermore, even where a high-frequency level or baseline has been established for a given application of a positive displacement pump, the detection of a leak in the pump is limited to leaks that result in vibrations that actually exceed this baseline frequency. Leaks that fail to present at frequencies above the expected noise level remain undiagnosed, the acoustic data from these leaks remaining buried below the established baseline.

SUMMARY

A monitor for a positive displacement pump is provided. The monitor includes a sensor coupled to the pump to obtain acoustic data from the pump during operation thereof and a proximity switch to obtain timing information relative to cycling of the pump during operation. A data processor is coupled to the sensor and the proximity switch to use the acoustic data and the timing information to determine the presence of a leak in a valve of the pump.

DETAILED DESCRIPTION

Embodiments are described with reference to certain positive displacement pumps such as hydraulic fracturing pumps. However, other positive displacement pumps may be employed for operations such as cementing, coil tubing and water jet cutting. Regardless, embodiments described herein employ a monitor to establish a condition of the pump and its internal valves by analyzing acoustic data relative thereto.

Figure 1:
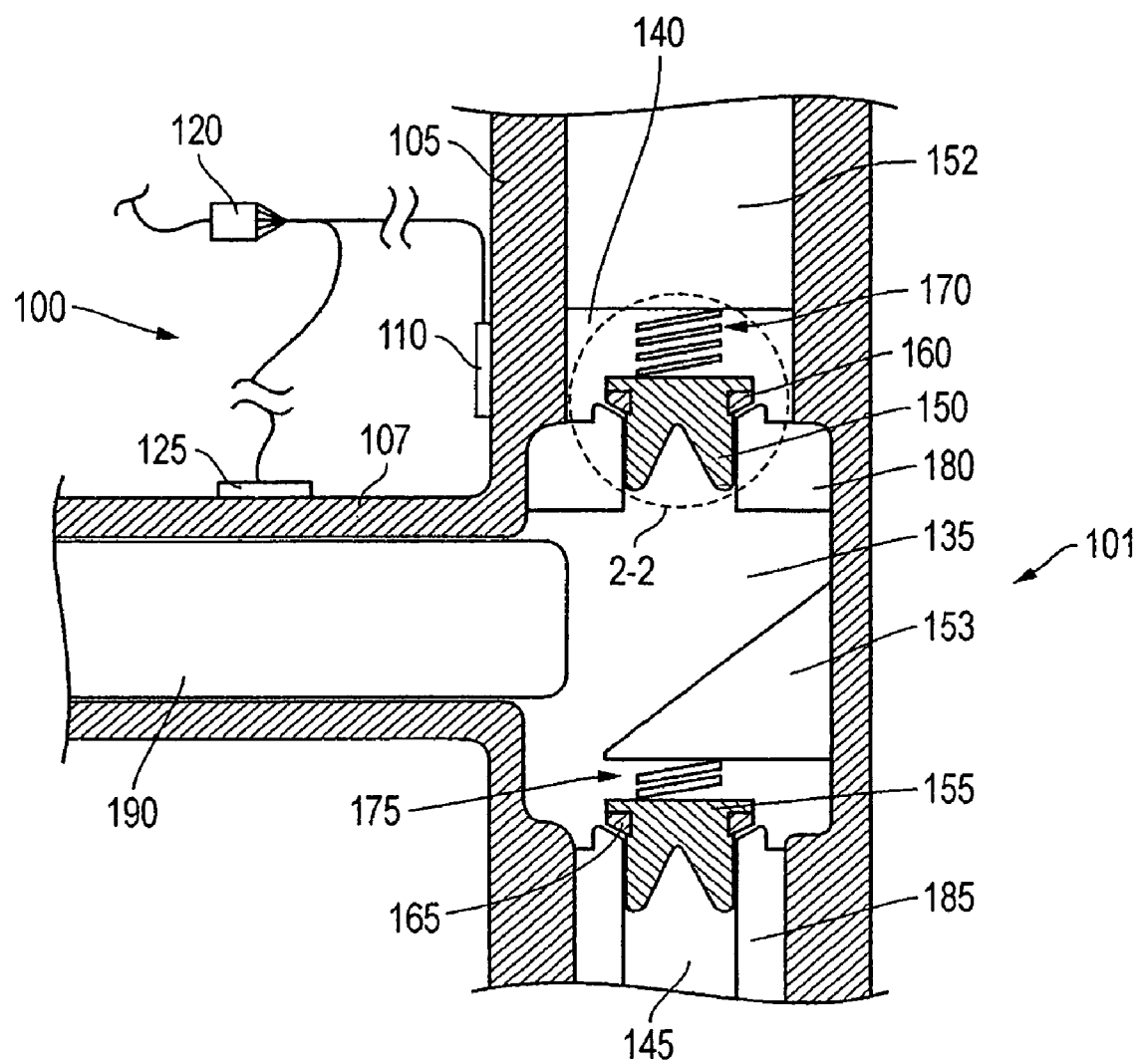
FIG. 1 is a side cross sectional view of an embodiment of a monitor coupled to a positive displacement pump.

Referring to FIG. 1, an embodiment of a positive displacement pump monitor 100 is shown coupled to a positive displacement pump 101. The monitor 100 includes a sensor 110 to obtain acoustic data from the pump 101 during operation. This may be achieved by securely coupling the sensor 110 to the main housing 105 of the pump 101. Acoustic data up to 100 KHz or more may be effectively detected in this manner. The data may then be analyzed by a data processor 120 to establish the condition of the pump 101 as described further herein.

The pump 101 shown in FIG. 1 includes a plunger 190 for reciprocating within a plunger housing 107 toward and away from a chamber 135. In this manner, the plunger 190 effects high and low pressures on the chamber 135. For example, as the plunger 190 is thrust toward the chamber 135, the pressure within the chamber 135 is increased. At some point, the pressure increase will be enough to effect an opening of a discharge valve 150 to allow the release of fluid and pressure within the chamber 135. Thus, this movement of the plunger 190 is often referred to as its discharge stroke. Further, the point at which the plunger 190 is at its most advanced proximity to the chamber 135 is referred to herein as the discharge position. The amount of pressure required to open the discharge valve 150 as described may be determined by a discharge mechanism 170 such as spring which keeps the discharge valve 150 in a closed position until the requisite pressure is achieved in the chamber 135. In an embodiment where the pump 101 is to be employed in a fracturing operation pressures may be achieved in the manner described that exceed 2,000 PSI, and more preferably, that exceed 10,000 PSI or more.

As described above, the plunger 190 also effects a low pressure on the chamber 135. That is, as the plunger 190 retreats away from its advanced discharge position near the chamber 135, the pressure therein will decrease. As the pressure within the chamber 135 decreases, the discharge valve 150 will close returning the chamber 135 to a sealed state. As the plunger 190 continues to move away from the chamber 135 the pressure therein will continue to drop, and eventually a low or negative pressure will be achieved within the chamber 135. Similar to the action of the discharge valve 150 described above, the pressure decrease will eventually be enough to effect an opening of an intake valve 155. Thus, this movement of the plunger 190 is often referred to as the intake stroke. The opening of the intake valve 155 allows the uptake of fluid into the chamber 135 from a fluid channel 145 adjacent thereto. The point at which the plunger 190 is at its most retreated position relative to the chamber 135 is referred to herein as the intake position. The amount of pressure required to open the intake valve 155 as described may be determined by an intake mechanism 175 such as spring which keeps the intake valve 155 in a closed position until the requisite low pressure is achieved in the chamber 135.

As described above, a reciprocating or cycling motion of the plunger 190 toward and away from the chamber 135 within the pump 101 controls pressure therein. The valves 150, 155 respond accordingly in order to dispense fluid from the chamber 135 and through a dispensing channel 140 at high pressure. That fluid is then replaced with fluid from within a fluid channel 145. Movement of the various moving parts of the pump 101 as described may resonate to a degree throughout the pump 101 including to its non-moving portions, such as at the main housing 105. Thus, as shown in FIG. 1, a sensor 110 may be secured to the main housing 105 to obtain acoustic data resonating thereat from the action of the pump 101 and its valves 150, 155 during operation as described above.

The described sensor 110 may be a conventional acoustic sensor or accelerometer capable of detecting the above described vibrations resonating through the main housing 105. As described further below, the acoustic data or vibrations detected by the sensor 110 may be attributable to particularly discrete movements within the pump 101 during operation. For example, the striking closed of the discharge valve 150 onto the discharge valve seat 180 following a discharge of fluid from the chamber 135 may provide a particularly discernable level of acoustic "strike" data to the sensor 110 as described further herein. For example, in an embodiment where the pump 101 is employed in a high pressure fracturing operation, a spike of at between 1 KHz to as much as 200 KHz or more may be detected by the sensor 110 upon the striking closed of the discharge valve 150.

Similarly, the striking closed of the intake valve 155 on the intake valve seat 185 following intake of fluid from the fluid channel 145 may result in a particularly discernable level of acoustic "strike" data resonating to the sensor 110. Again this may be to between 1 KHz to as much as 200 KHz or more for a pump 101 employed in a high pressure fracturing operation.

Continuing with reference to FIG. 1, the above described collection of acoustic data by the sensor 110 allows for the continuous real time monitoring of the condition of the pump 101. For example, while the striking closed of the valves 150, 155 as described above provides expected normal acoustic data for a pump 101 operating normally, other acoustic data (i.e. "non-strike" data) may be obtained by the sensor 110 which is also indicative of normal operations or may be indicative of the pump 101 operating abnormally as described below. Regardless, all of the data obtained by the sensor 110 is transmitted to a data processor 120 for analysis according to techniques described further herein. The data processor 120 may be a microprocessor affiliated with the individual pump 101. Additionally, in one embodiment, the data processor 120 is coupled to a centralized computer system, wherein the system monitors multiple pumps simultaneously.

Figure 2:
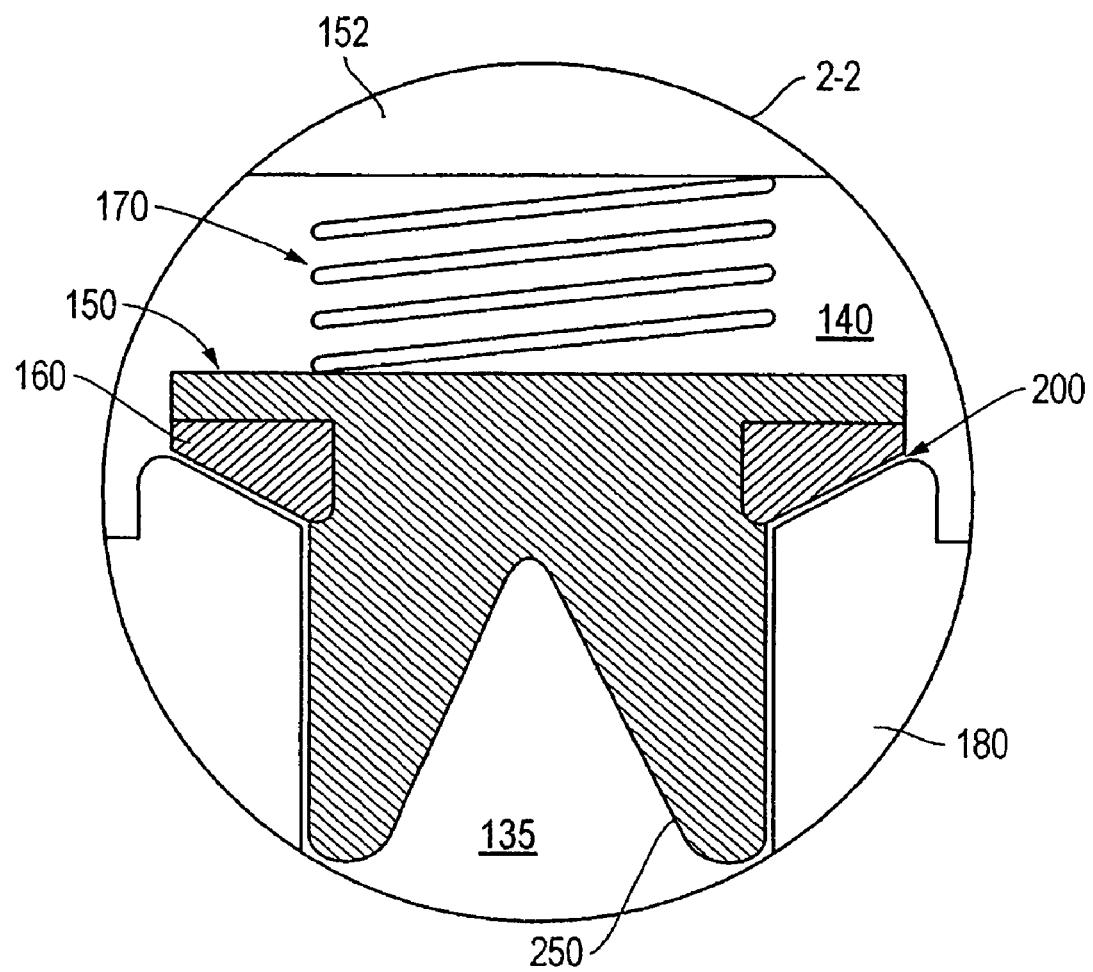
FIG. 2 is an enlarged view of an embodiment of a valve taken from 2-2 of FIG. 1.

Referring now to FIG. 2, an enlarged view of the discharge valve 150 taken from section lines 2-2 of FIG. 1 is shown. The discharge valve 150 is shown biased between the discharge valve seat 180 and a discharge plane 152 by way of the spring discharge mechanism 170. In the embodiment shown, the discharge valve 150 includes valve legs 250 and a valve insert 160. The valve legs 250 guide the discharge valve 150 into a portion of the pump chamber 135 in sealing the chamber 135 off from the dispensing channel 140 as described above. The chamber 135 is ultimately sealed off when the discharge valve seat 180 is struck by the discharge valve 150 with its conformable valve insert 160 shown. As described below, employment of a conformable valve insert 160 for sealing off of the chamber 135 is conducive to the pumping of abrasive containing fluids through the pump 101 of FIG. 1.

As noted above, when the discharge valve 150 strikes the discharge valve seat 180 a discernable level of acoustic data, referred to herein as strike data, may be detected by the sensor 110. However, this strike data diminishes almost immediately where the valve 150 makes a complete seal at the discharge valve seat 180. That is, following such a strike of the valve 150, acoustic data attributable to the precise area of the valve 150 should be negligible. However, as described below, in circumstances where a completed seal fails to form between the valve 150 and the valve seat 180, acoustic vibration may persist that is attributable to a leak between the chamber 135 and the dispensing channel 140.

As alluded to earlier, a positive displacement pump 101 is well suited for high pressure applications of abrasive containing fluids. In fact, embodiments described herein may be applied to cementing, coil tubing, water jet cutting, and hydraulic fracturing operations, to name a few. However, where abrasive containing fluids are pumped, for example, from a chamber 135 and out a valve 150 as shown in FIG. 2, it may be important to ensure that abrasive within the fluid not prevent the valve 150 from sealing against the valve seat 180. For example, in the case of hydraulic fracturing operations, the fluid pumped through a positive displacement pump 101 may include an abrasive or proppant such as sand, ceramic material or bauxite mixed therein. By employing a conformable valve insert 160, any proppant present at the interface 200 of the valve 150 and the valve seat 180 substantially fails to prevent closure of the valve 150. That is, the conformable valve insert 160 is configured to conform about any proppant present at the interface 200 thus allowing the valve 150 to seal off the chamber 135 irrespective of the presence of the proppant.

While the above technique of employing a conformable valve insert 160 where an abrasive fluid is to be pumped allows for improved sealability of valves, it also leaves the valve 150 susceptible to degradation by the abrasive fluid. That is, a conformable valve insert 160 may be made of urethane or other conventional polymers susceptible to degradation by an abrasive fluid. In fact, in conventional hydraulic fracturing operations, a conformable valve insert 160 may degrade completely in about one to six weeks of continuous use. As this degradation begins to occur a completed seal fails to form between the valve 150 and the valve seat 180. As noted above, an acoustic vibration may then persist that is attributable to a growing leak between the chamber 135 and the dispensing channel 140. Embodiments described herein reveal techniques for capturing such non-strike acoustic data, establishing the data as attributable to a particular valve 150, 155, and discerning it as leak information as distinguishable from other expected or normal acoustic noise.

Figure 3:
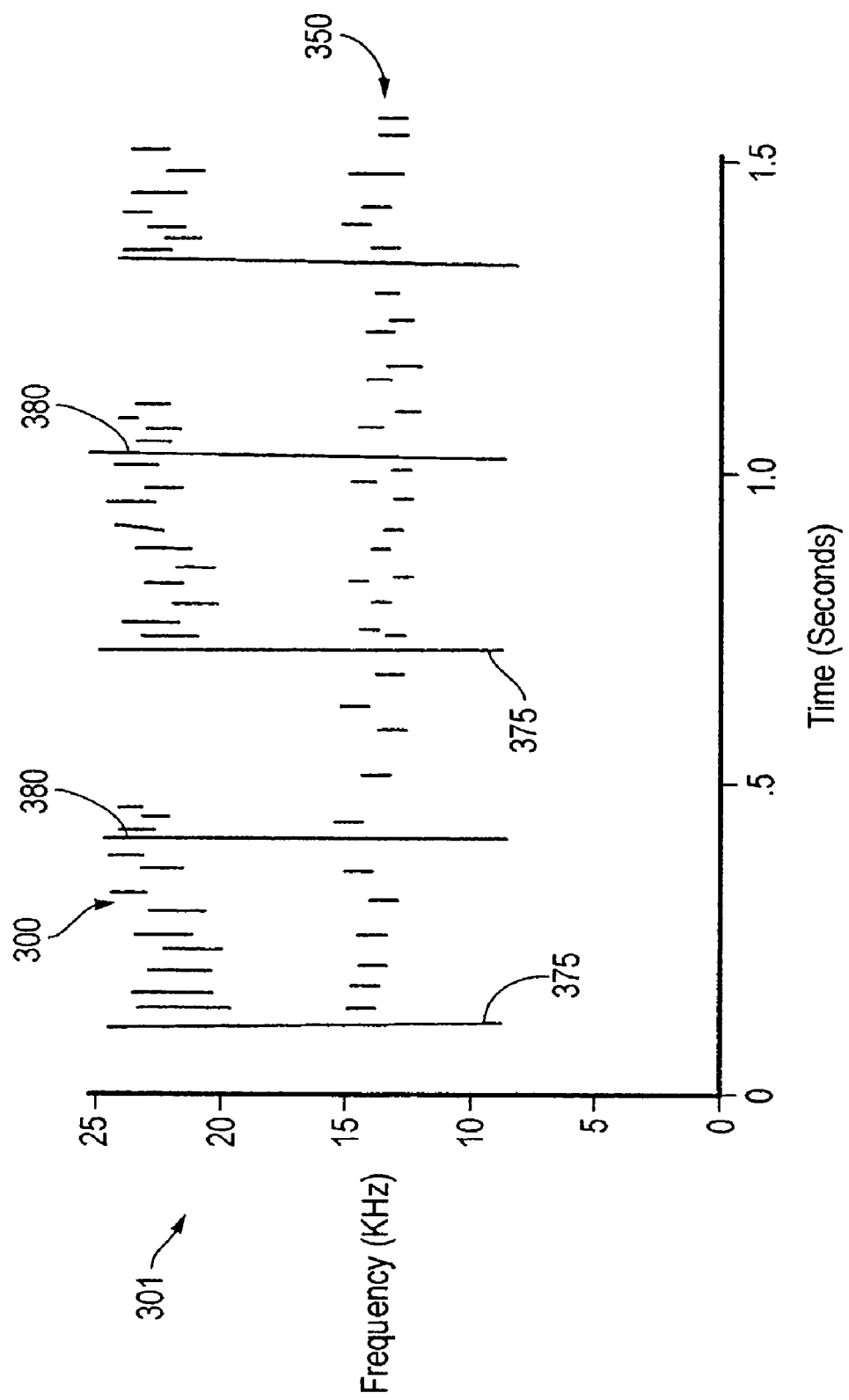
FIG. 3 is a chart depicting an embodiment of employing the monitor of FIG. 1 to evaluate acoustic data from the positive displacement pump in the time domain.

Referring now to FIG. 3, with added reference to FIGS. 1 and 2, techniques by which acoustic data may be analyzed over a short time frame are described. As the plunger 190 reciprocates the valves 150, 155 open and close pumping fluid through the pump 101 as described above. As noted, acoustic data may be collected by the sensor 110 during this cycling of the pump 101. FIG. 3 reveals a schematic representation, in the form of a short time chart, of how this might look in terms of frequency of the collected data plotted over time.

The time based frequency analysis of the data described above is performed by the data processor 120 in intervals short enough to establish the existence of any leakage occurring within the pump. As described below, this analysis will examine short consecutive periods. Note that the entire x-axis of the chart of FIG. 3, covering several such periods, is little more than 1.5 seconds long. These periods are no greater than a one half of a full reciprocation of the plunger 190. In this manner complete discharge or intake strokes may be evaluated and allow the opportunity for each strike of the valves 150, 152 to be acoustically recorded. One half of a full reciprocation of the plunger 190 may also be referenced herein as the duration of movement of the plunger 190 between the intake position and the discharge position as described above.

With continued reference to FIGS. 1-3, the generation of acoustic data during operation of the pump 101 is described. As the plunger 190 moves away from its discharge position nearest the chamber 135, the pressure therein reduces and the discharge valve 150 may strike closed at the discharge valve seat 180. This discharge valve strike 375 may be seen visually as strike data at FIG. 3. The discharge valve strike 375 is discernable, strongly resonating at between about 10 KHz and about 25 KHz or more at a fairly discrete point in time. The intake valve 155 then opens as the plunger 190 advances to its intake position away from the chamber 135, effecting a low or negative pressure thereon. Then, upon reciprocating back toward the chamber 135, the plunger 190 allows pressure to rise therein such that the intake valve 155 strikes closed at the intake valve seat 185. In the chart of FIG. 3, this intake valve strike 380 is also discernable strike data, strongly resonating at between about 10 KHz and about 25 KHz or more at a fairly discrete point in time. As the plunger 190 continues toward its discharge position, pressure in the chamber 135 continues to rise and eventually the discharge valve 150 opens.

Apart from the strikes 375, 380, the chart of FIG. 3 reveals other non-strike acoustic data 300, 350 as the pump 101 operates over time. Some of the non-strike acoustic data is merely acceptable noise 350, while other data represents a leak information 300. However, these types of non-strike acoustic data 300, 350 are discernable from one another when examining their relationship, if any, to the strikes 375, 380 or the duration of a stroke. In fact, in one embodiment, determining a relationship between one of the strikes 375, 380 or stroke periods and one of the types of non-strike acoustic data 300, 350 may establish both the presence of a leak and may also help determine which valve 150, 155 is the source of the leak as described further below (see FIG. 1). As also described further herein, in another embodiment, such leak information may be deciphered evein in the absence of strike data altogether.

Continuing with reference to FIGS. 1 and 3, a discharge valve strike 375 at less than 0.5 seconds is shown at the far left of the chart. The data processor 120 is able to establish this signal as a discharge valve strike 375 through a technique that employs stored information relative to what constitutes a strike and the use of a proximity switch 125. That is, the data processor 120 may have stored information relative to what constitutes a strike over a broad range of possible operation parameters for a given pump 101. For example, in one embodiment, the data processor 120 may be programmed to interpret any substantially uninterrupted signal over a 1 KHz range and less than about 5 milliseconds in duration to be indicative of a strike.

In one embodiment, once the presence of a strike is established, the determination as to whether the strike is a discharge valve strike 375 or an intake valve strike 380 may be established with the aid of the proximity switch 125. The proximity switch 125 is mounted to the plunger housing 107. In the embodiment shown, the proximity switch 125 detects the position of the plunger 190 via conventional means such as by detection of a passing plunger clamp or other detectable device secured to the plunger 190. This position and timing information is conveyed to the data processor 120. The data processor 120 has stored information relative to the timing and order of the moving parts of the pump 101. Thus, with the timing feedback from the proximity switch 125, the data processor 120 is able to establish that the strike at less than 0.5 seconds is, for example, a discharge valve strike 375 as opposed to an intake valve strike 380. Similarly, the strike just after 0.5 seconds may be established as an intake valve strike 380.

With the strikes 375, 380 established, other non-strike acoustic data may be analyzed with reference thereto. For example, immediately after the initial discharge valve strike 375 at the far left of the chart of FIG. 3, other acoustic data is revealed in the form of leak information 300 and in the form of acceptable noise 350. When examined visually and as analyzed by the data processor 120, it can be determined that leak information 300 presents in the form of a pattern that dissipates at some point after the initial discharge valve strike 375, such that just prior to the next discharge valve strike 375 at between 0.5 and 1.0 seconds, leak information 300 is no longer present. However, upon this next discharge valve strike 375, leak information 300 immediately reappears. As described further below, this leak information 300 is persisting for about a duration of a stroke, discharge or intake, of the pump 101 (see FIG. 1).

When considering the timing and order of the moving parts within the pump 101, it is apparent that the leak information 300 shown in FIG. 3 is revealing a leak at the discharge valve 150. That is, with added reference to FIG. 2, as the discharge valve 150 strikes closed against the discharge valve seat 180 (i.e. as shown at 375), a complete seal of the chamber 135 fails to occur. Thus, leakage of fluid back into the chamber 135 occurs at the interface 200, most likely the result of a degrading valve insert 160. This results in a vibration or acoustic data which can be seen as leak information 300 in FIG. 3. However, as the motion of the pump 101 continues the discharge valve 150 opens just after the closure of the intake valve 155 (visible as the intake valve strike 380). This opening of the leaky discharge valve 150 allows vibrations from the leak at the interface 200 to dissipate and thus, the leak information 300 disappears. In one embodiment, a properly programmed data processor 120 coupled to a graphical user interface (GUI), beyond the chart of FIG. 3, may then inform an operator of the presence of the leak at the discharge valve 150.

The chart of FIG. 3 plots acoustical data for a single pump 101 with a single plunger 190 and assembly of valves 150, 155. However, in certain embodiments (such as in FIG. 6. discussed in more detail below) the pump 101 includes more than one plunger and valve assembly. Nevertheless, as described below, a single monitor 100 having a sensor 110 at the common main housing 105 and a proximity switch 125 at one of the plunger housings 107 may still provide all of the above-referenced acoustic data in a discernable fashion.

Figure 6:
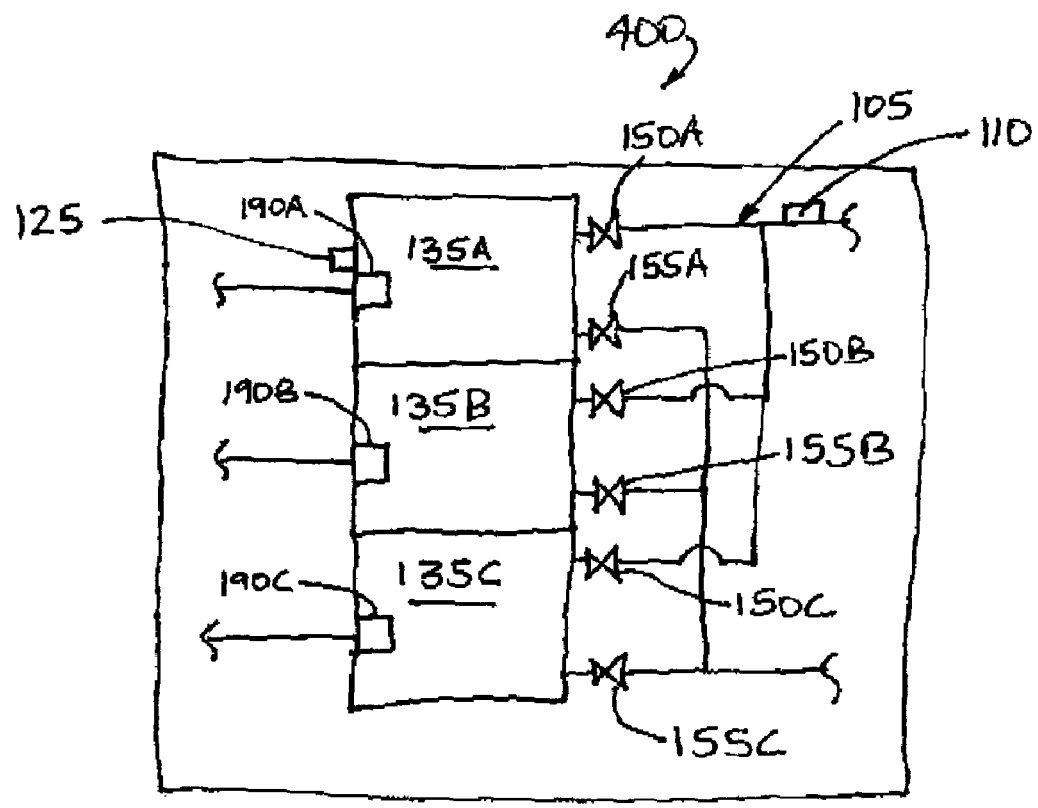
FIG. 6 is a schematic view of a triplex pump for use with an embodiment of the monitor of FIG. 1.

In one embodiment, the pump 101 is a pump 400 shown schematically in FIG. 6 and includes three plunger and valve assemblies having individual chambers 135A, 135B, and 135C sharing a common housing (i.e. a "triplex" pump), as will be appreciated by those skilled ion the art, shown schematically at 400 in FIG. 6 and including plungers 190A, 190B, and 190C and valves, 150A, 150B, 150C, and 155A, 155B, and 155C. Therefore, over a given period of time it might seem likely that three times the number of strike data would be recorded by the monitor 100. Thus, establishing or associating a particular leak pattern with a given valve or valve assembly may seem problematic. However, in such an embodiment, the timing and positioning of the plungers may be offset from one another, for example, by 120° from one plunger to the next. Thus, a proximity switch 125 at just one of the plunger housings allows for extrapolation by the data processor 120 in order to associate each piece of acoustic data with the proper striking valve or stroke of the pump 101. As a result, any detected leak information 300 may be associated with the proper leaky valve, even in such a multi-valve assembly pump 101 or 400. In fact, even in the case of multiple leaks that give rise to the overlap of leakage data, the increased amplitude of the leak infonnation 300 for the period of the overlap allows for proper identification of the leaks with analysis by the data processor 120.

With added reference to FIG. 1, the strikes 375, 380 of FIG. 3 are fairly distinct allowing the data processor 120 and even manual visual analysis to distinguish leak information 300. However, as mentioned above, even in circumstances where strikes 375, 380 fail to present in a distinct fashion, a determination of the presence of leak information 300 may be made. For example, based on the operating speed of the pump 101, the length of the discharge or intake stroke is known. Thus, acoustic information of a particular range of frequency that persists for about the duration of a stroke is leak information 300 regardless of the presence of decipherable strike data 375, 380. That is, recalling the cycling of the pump 101 as described above, a given valve 150, 155 remains closed for about a period equal to a stroke of the plunger 190. Thus, acoustic data that persists in intervals of such a duration is leak information 300.

Continuing with reference to FIGS. 1-3, other acoustic data in the form of acceptable noise 350 is detected as shown in FIG. 3. However, this acceptable noise 350 fails to present for substantially the duration of a stroke or to form a pattern relative to the strikes 375, 380. That is, this acceptable noise 350 may be from other nearby operating equipment or even the pump 101 itself. However, with no particular connection to the strikes 375, 380, or stroke duration the acceptable noise 350 is not indicative of a leak at the interface 200 of a valve 150, 155 and a valve seat 180, 185. Therefore, this information need not be selected by the data processor 120 for highlighting to an operator.

The above described monitor 100 and technique may be applied to vast array of positive displacement pump operations by properly securing the monitor 100 and proximity switch 110 to the pump 101 and having preprogrammed a broad range of possible strike data into the data processor 120. The monitor 100 and technique do not require a unique baseline of acoustic data be established for each and every given pump operation. As frequency levels, overall noise and other acoustic indications change from one operation of the pump to the next, the parameters of the above described technique need not be reset.

Figure 4:
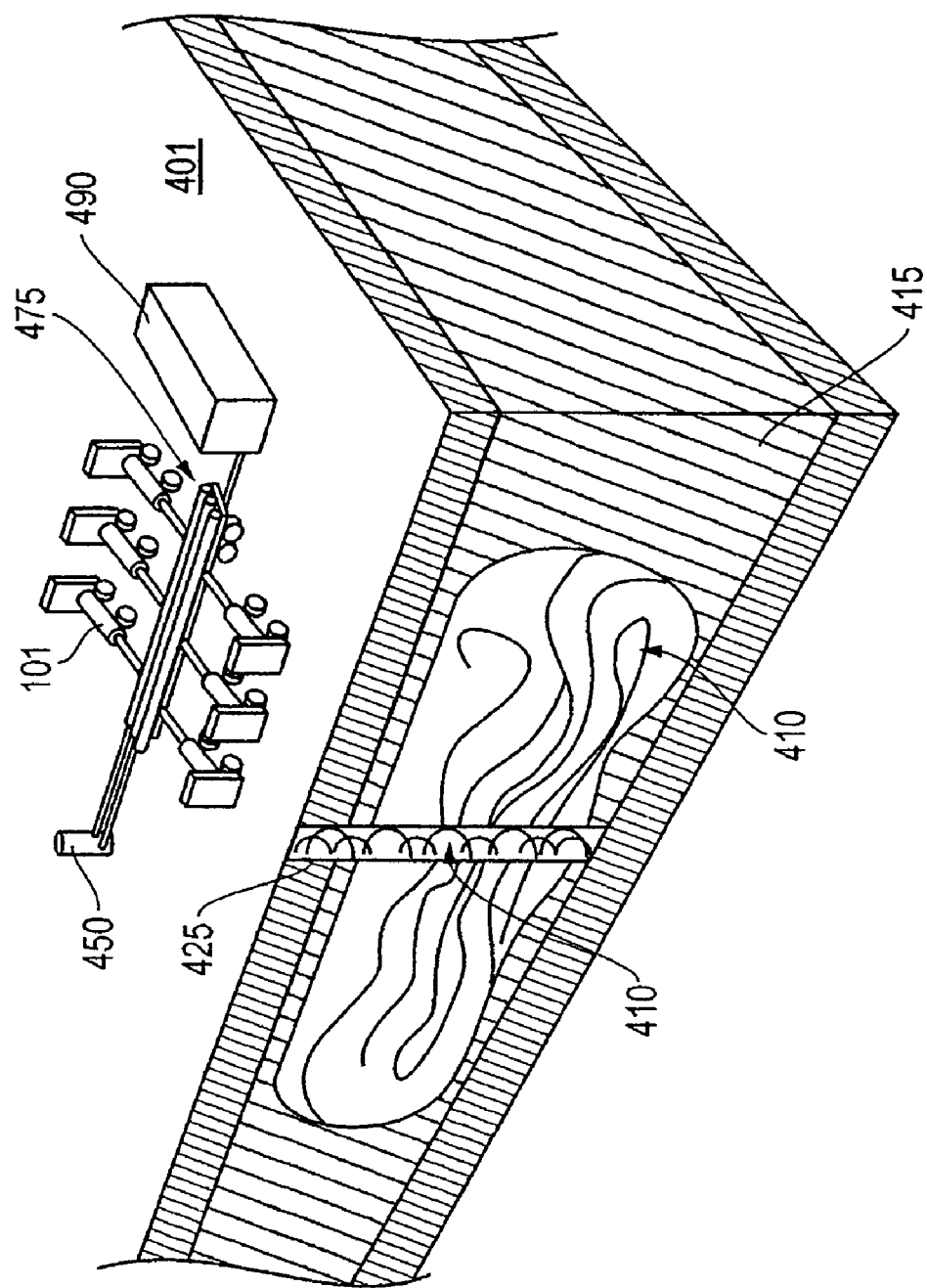
FIG. 4 is a side sectional view of an embodiment of employing positive displacement pumps in a fracturing operation.

Continuing with reference to FIG. 4, multiple positive displacement pumps 101 are shown in simultaneous operation at the same hydraulic fracturing site 401. These pumps 101 may be no more than 10-12 feet from one another. Each pump 101 may operate at between about 700 and about 2,000 hydraulic horsepower to propel an abrasive fluid 410 into a well 425. The abrasive fluid 410 contains a proppant such as sand, ceramic material or bauxite for disbursing beyond the well 425 and into fracturable rock 415 or other earth material.

In the embodiment shown in FIG. 4 each pump 101 may generate between about 2,000 and about 15,000 PSI or more. Further, in addition to the six pumps 101 shown, other equipment may be directly or indirectly coupled to the well head 450 for the operation. This may include a manifold 475 for fluid communication between the pumps 101. A blender 490, and other equipment capable of generating considerable acoustic noise during an operation may also be present. Nevertheless, with added reference to FIGS. 1-3 and as described above, this extraneous noise fails to significantly impact the performance of a monitor 100 properly coupled to each pump 101 as shown. That is, this extraneous acceptable noise 350 fails to reveal a relationship to any strike 375, 380, or stroke duration and is thus discarded by the data processor 120 when analyzing acoustic data for leak information 300. Alternatively, as described above, any pattern of leak information 300 generated from within a pump 101 to which the monitor 100 is coupled, will be detectable by the monitor 100 according to the techniques described above.

Continuing with reference to FIGS. 1-4, in a multi-pump operation each data processor 120 for each monitor 100 of each pump 101 may be independently coupled to a centralized computer system, for example, employing the GUI noted above, where an operator may review the operating condition of each pump 101 simultaneously. In a multi-pump operation, the operator may be able to monitor the severity of any given leak information 300 and, where necessary, interact with the GUI to effect modifications in the parameters of the operation, including at individual pumps 101. In this manner, the efficiency and effectiveness of the overall pump operation may be maximized.

Figure 5:
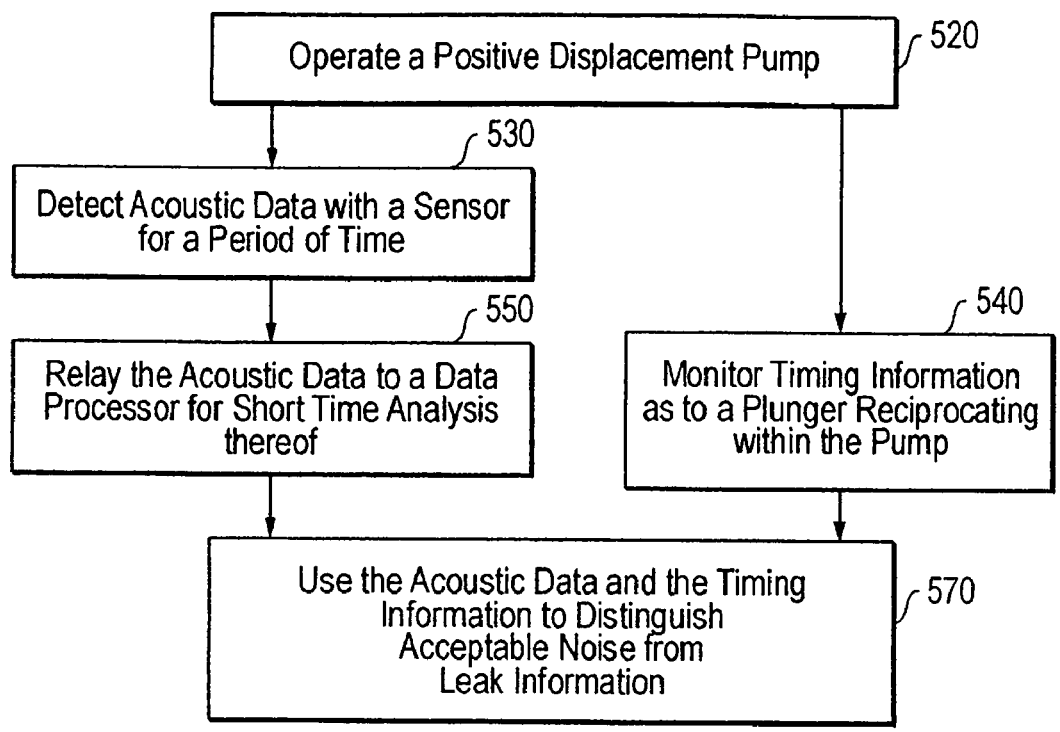
FIG. 5 is a flow chart describing an embodiment of monitoring the condition of a positive displacement pump in operation.

Referring now to FIG. 5, an embodiment of monitoring the condition of a positive displacement pump in operation is summarized in the form of a flow chart. Namely, the positive displacement pump is operated while an acoustic sensor detects acoustic data therefrom as indicated at 520 and 530. The acoustic data is relayed to a data processor for short time analysis thereof as indicated at 550. At this same time, timing information is accounted for, for example, by monitoring with a proximity switch tracking the position of a plunger reciprocating within the pump (see 540). As indicated at 570, the acoustic data and the timing information may be used by the data processor to distinguish acceptable noise from leak information.

The embodiments described herein provide for effective monitoring of a positive displacement pump without the requirement of additional equipment or procedures often found in other conventional monitoring techniques and assemblies. For example, in the above described embodiments a single monitor and sensor may be employed even where multiple plunger and valve assemblies sharing a common pump housing are involved (such as in the above described triplex pump).

Embodiments described herein include monitoring techniques that may be achieved without requiring that a baseline frequency level be predetermined for each new application of a given pump. As such, any leak information detected is not merely discarded due to the particular frequency at which it presents. No calibrations need to be performed for each new set of pump operating conditions encountered nor does a pump need to operate under the same conditions from application to application. Further, embodiments described herein allow for the recognition of leak information without requiring training of the monitor and data processor for recognition of patterns of acoustic data at the outset of a given operation.

In a multi-pump operation, there is no requirement that a history of pumps or other equipment be taken into account in employing embodiments described herein. In fact, such pumps do not need to operate under the same speed, pressure or other conditions as one another in a given operation.

Although exemplary embodiments describe monitoring of particular positive displacement pumps such as hydraulic fracturing pumps, additional embodiments are possible. Furthermore, many changes, modifications, and substitutions may be made without departing from the spirit and scope of the described embodiments.

We claim:

1. A monitor for a positive displacement pump, the monitor comprising:

a sensor coupled to the pump to obtain acoustic data therefrom during operation of the pump, the acoustic data comprising strike acoustic data and non-strike acoustic data; and a data processor coupled to the sensor to use the acoustic data and timing information relative to the pump during operation to decipher acoustic data from the strike acoustic data and non-strike acoustic data that is leak information.

2. The monitor of claim 1 further comprising a proximity switch coupled to the pump and said data processor to provide the timing information.

3. The monitor of claim 1 wherein said sensor is an accelerometer.

4. The monitor of claim 1 wherein said data processor deciphers acoustic data that is leak information by distinguishing acoustic data that presents for about the duration of a stroke of the pump as the leak information.

5. The monitor of claim 4 wherein a stroke is one of a discharge stroke and an intake stroke of a plunger with respect to a chamber of the pump.

6. The monitor of claim 5 wherein the discharge stroke of the plunger generates more than about 2,000 pounds per square inch of pressure within the chamber.

7. The monitor of claim 1 wherein said data processor deciphers acoustic data that is leak information by distinguishing non-strike acoustic data that is acceptable noise from non-strike acoustic data that is leak information.

8. The monitor of claim 7 wherein the acoustic data is acoustic data resonating from a strike of a valve of the pump against a valve seat of the pump.

9. The monitor of claim 8 wherein the valve includes a conformable valve insert to contact the valve seat during the strike.

10. A positive displacement pump assembly comprising:

a positive displacement pump having a plunger for effecting pressurization on a chamber of the pump for pushing a fluid therethrough during an operation; and a monitor having a sensor coupled to the pump to obtain acoustic data from the operation, the acoustic data comprising strike acoustic data and non-strike acoustic data, and a data processor coupled to the sensor to use timing information relative to the pump during the operation and the acoustic data to decipher acoustic data from the strike acoustic data and non-strike acoustic data that is leak information indicative of a leak of the fluid into the chamber.

11. The assembly of claim 10 wherein said positive displacement pump is a first pump, the assembly further comprising:

a second positive displacement pump in fluid communication with said first pump; and a centralized computer system coupled to the first pump and said second pump for simultaneous monitoring thereof.

12. The assembly of claim 10 wherein the fluid is an abrasive containing fluid, the abrasive selected from sand, a ceramic material, and bauxite.

13. The assembly of claim 10 wherein said pump is of a triplex configuration.

14. A method of monitoring a positive displacement pump, the method comprising:

operating the pump;

obtaining acoustic data from the pump, the acoustic data comprising strike acoustic data and non-strike acoustic data;

recording timing information relative to said operating of the pump; and analyzing the acoustic data in light of the timing information to decipher acoustic data from the strike acoustic data and non-strike acoustic data that is leak information.

15. The monitor of claim 14 wherein said analyzing further comprises distinguishing acoustic data that presents for about the duration of a stroke of the pump as the leak information.

16. The method of claim 14 wherein said analyzing further comprises distinguishing non-strike acoustic data that is acceptable noise from non-strike acoustic data that is the leak information.

17. The method of claim 14 wherein the pump is of a triplex configuration, said analyzing further comprising monitoring leak information amplitude to decipher leak information attributable to overlapping multiple leaks.

18. The method of claim 14 wherein said operating further comprises pumping an abrasive containing fluid through the pump for a pressurized application.

19. The method of claim 18 wherein the pressurized application is one of cementing, coil tubing, water jet cutting, and hydraulic fracturing.

20. A method of monitoring positive displacement pumps in a pressurized application, the method comprising:

operating the pumps simultaneously;

obtaining acoustic data from each of the pumps, the acoustic data comprising strike acoustic data and non-strike acoustic data;

recording timing information relative to each of the pumps during said operating; and analyzing the acoustic data for each of the pumps in relation to the timing information for each pump to decipher acoustic data from the strike acoustic data and non-strike acoustic data that is leak information.

21. The method of claim 20 further comprising indicating the leak information at a graphical user interface coupled through a centralized computer system to each of the pumps.

22. The method of claim 20 wherein said analyzing further comprises distinguishing any acoustic data of a given pump that presents for about the duration of a stroke of the given pump as the leak information.

23. The method of claim 20 wherein said analyzing further comprises distinguishing non-strike acoustic data of a given pump that is acceptable noise from non-strike acoustic data of the given pump that is the leak information.

* * * * *